United States Patent [19]

Freshel

[11] 3,992,813

[45] Nov. 23, 1976

[54] TREE TREATING SYSTEM

[76] Inventor: David C. Freshel, 19196 Bretton Drive, Detroit, Mich. 48223

[22] Filed: July 7, 1975

[21] Appl. No.: 593,376

[52] U.S. Cl. .................................. 47/57.5; 239/269

[51] Int. Cl.[2] ........................................ A01G 29/00

[58] Field of Search ................ 47/57.5, 52; 239/269

[56] References Cited

UNITED STATES PATENTS

| | | | |
|---|---|---|---|
| 1,756,453 | 4/1930 | Davey et al. | 47/57.5 |
| 2,044,063 | 6/1936 | Dahlberg | 47/57.5 |
| 2,755,985 | 7/1956 | Finegan | 239/269 X |
| 3,834,075 | 9/1974 | Nix et al. | 47/57.5 |

FOREIGN PATENTS OR APPLICATIONS

| | | | |
|---|---|---|---|
| 802,412 | 2/1951 | Germany | 47/57.5 |

*Primary Examiner*—Robert E. Bagwill

*Attorney, Agent, or Firm*—Barnes, Kisselle, Raisch & Choate

[57] ABSTRACT

A tree treating system comprising a plurality of injector assemblies, each injector assembly comprising a pipe insertable in an opening in a tree, a female quick disconnect one way valve socket connected to the pipe as an outlet, and a male connector connected to the pipe as an inlet. The system further includes a plurality of hose assemblies, each hose assembly comprising a flexible length of clear plastic tubing, a female quick disconnect one way valve socket connected to the outlet end of the tubing, and a male connector connected to the inlet end of the tubing, such that each injector assembly may be placed in an opening in a tree and the injector assemblies may be connected in series by connecting the female one way disconnect connector socket of said first injector assembly to the male plug of a hose assembly, connecting the female one way valve connector socket of the hose assembly to the male plug of the next adjacent injector assembly, and similarly interconnecting successive injector assemblies by hose assemblies. The system includes a liquid container having a male quick disconnect one way valve thereon, a connecting hose having a female one way valve connector connected to each end thereof, one end of which is adapted to engage the male input plug of the first of a series of injector assemblies, the other end of which is adapted to be connected to the male quick disconnect one way valve of the liquid container. The liquid container has a second male quick disconnect valve and a second connecting hose adapted to engage a source of fluid pressure. As many liquid and pressure-filled containers may be connected in series as is appropriate to the application at hand.

8 Claims, 7 Drawing Figures

FIG. 1
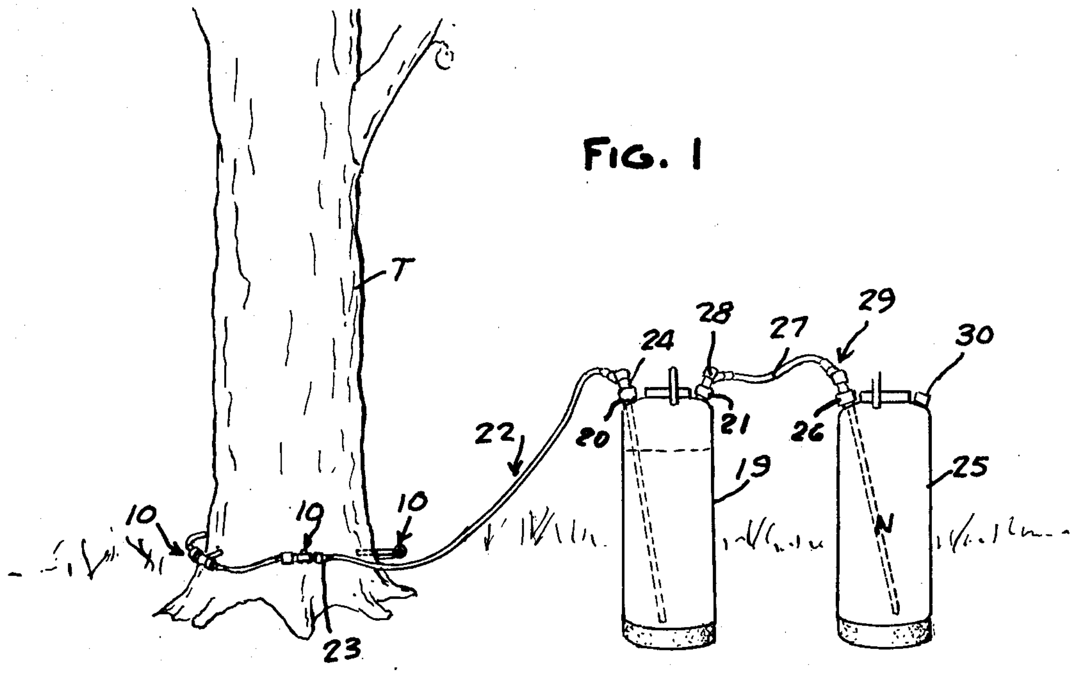
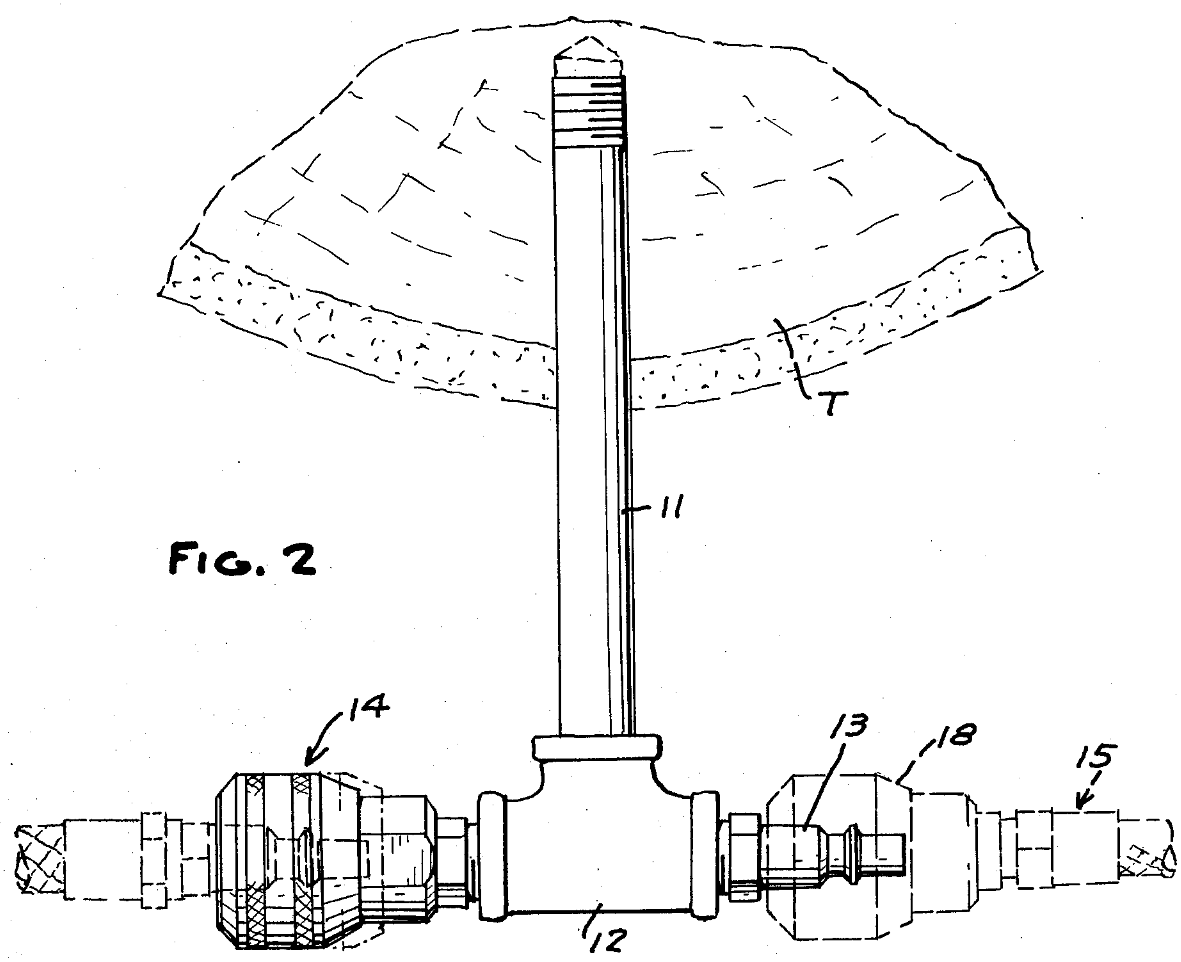
FIG. 2

TREE TREATING SYSTEM

This invention relates to treating of trees with fungicide as, for example, to aid in the control of Dutch Elm Disease.

BACKGROUND OF THE INVENTION

As is well known, diseases of trees are not unusual and a particularly devastating disease is Dutch Elm Disease. In an effort to aid in the treatment and inhibit the growth of Dutch Elm Disease, it has been common to treat the trees with fungicides such as benomyl fungicide sold under the trademark "BENLATE"by E. I. Du Pont De Nemours Co. Such a fungicide is suspended in water and usually injected into the trees. Another fungicide under experimental use at the present time is Fungicide BLP having the active ingredients of methyl 2-benzimidazolecarbamate phosphate. The latter fungicide is corrosive as are most soluble fungicides.

In one type of system for applying fungicides, holes are drilled circumferentially around the trees and nozzles are inserted into the holes. Adjacent nozzles are interconnected by tubing, each segment of which is captive to is nozzle by design and fabrication, and the liquid containing the fungicide is connected to the tubing from a single pressure tank which is usually a manual pressurized tank. In another system, a plurality of tubes are extended to each nozzle from a manifold and the liquid is supplied to the manifold under pressure from a single tank.

One of the problems in such treatments is the control of the amount of liquid supplied to each tree. It has been common to utilize a tank of a particular size and apply the entire contents of the tank or apply the liquid to the tree for a predetermined period of time, whichever occurs first. Since the fluid pressure applied to the liquid may fluctuate, there is no assurance of the correct amount nor that adequate pressure was available to lift the mixture to the furthest parts of the crown. Moreover, if more is needed than is available in a single tank, it is necessary to stop the operation for a sufficient length of time to refill the tank.

Accordingly, among the objects of the invention are to provide a system wherein the amount of the liquid may be varied, the use of small tanks is permitted, and the treatment is not interrupted for any substantial length of time in order to refill the tanks. This is important since in the case of wettable powder application, this system's higher average pressure capability tends to insure completion of injection before material precipitates out of suspension.

Another problem with respect to such prior systems is that different nozzles are utilized at different points around the tree so that care must be exercised in placement of the nozzles and a supply of different parts is needed. Accordingly, among the objects of the invention is to provide a system utilizing interchangeable parts so that relatively unskilled labor may be used in applying the equipment to the tree while permitting the licensed applicator to select the most critical point in the circumference of the tree for prime (top pressure) placement.

Another problem with respect to the prior systems is that when a line is plugged as by failure of passage through any particular nozzle or air entrapment, it is difficult to determine such stoppage readily. Accordingly, among the objects of the invention is to provide a system wherein stoppage or leakage may be readily detected and immediately bridged, allowing injection to continue while repair is underway.

A further object of the invention is to provide a system wherein clumps of trees can be treated readily and wherein the time of treatment may be controlled both from the standpoint of proper treatment of the tree and savings in time of usage of the equipment and labor.

Another object of the invention is to provide a completely closed system, wherein no one, other than the licensed applicator, has contact with the injectable material.

SUMMARY OF THE INVENTION

The tree treating system embodying the invention comprises a plurality of injector assemblies, each injector assembly comprising a pipe insertable in an opening in a tree, a female quick disconnect one way valve socket connected to the pipe as an outlet, and a male plug connected to the pipe as an inlet. The system further includes a plurality of hose assemblies, each hose assembly comprising a flexible length of clear plastic tubing, a female quick disconnect one way valve socket connected to the outlet end of the tubing, and a male connector plug connected to the inlet end of the tubing, such that each said injector assembly may be placed in an opening in a tree and the injector assemblies may be connected in series by connecting the female one way valve connector socket of said first injector assembly to the male disconnect plug of a hose assembly, connecting the female one way valve connector socket of the hose assembly to the male connector of the next adjacent injector assembly, and similarly interconnecting successive injector assemblies by hose assemblies. The system includes one or more liquid containers each having a male quick disconnect one way valve thereon, a connecting hose having a female one way valve connector connected to each end thereof one end of which is adapted to engage the male connector of the first of a series of injector assemblies and the other end of which is adapted to be connected to the male quick disconnect one way valve of the liquid container. Each liquid container has a second male quick disconnect one way valve and a second connecting hose. The second connecting hose has a female valve connector thereon adapted to engage the second male quick disconnect valve on said liquid container and a similar female quick disconnect valve at the other end thereof adapted to engage the male quick disconnect one way valve on anohter liquid-filled container or on a source of fluid pressure.

DESCRIPTION OF THE DRAWINGS

FIG. 1 is a perspective view of a tree treating system embodying the invention.

FIG. 2 is a fragmentary plan view of a portion of the system.

DESCRIPTION

Figure 3:
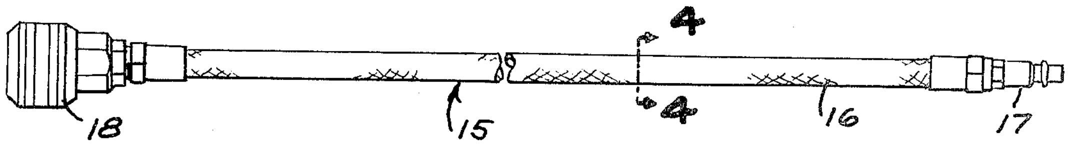
FIG. 3 is a fragmentary view of another portion of the system.
Figure 4:
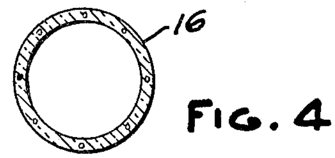
FIG. 4 is a sectional view taken along the line 4—4 in FIG. 3.

Referring to FIG. 1, a tree T treated in accordance with the system of the invention has a plurality of openings drilled circumferentially around the trunk thereof and injector assemblies 10 are inserted in each opening. The injector assemblies 10 are substantially identical amd include a pipe 11 having a threaded end that is inserted in the opening in the tree and a T-pipe 12 at the opposite end of the pipe 11. A male connector plug 13 is provided at one end of the T-pipe and a female quick disconnect one way valve socket 14 is provided at the other end.

The system further includes a plurality of substantially identical hose assemblies 15 (FIG. 3), each of which includes a length of flexible tubing 16 which is preferably made of transparent glass fiber-reinforced polyvinyl chloride. A male connector plug 17 similar to plug 13 is provided at one end of the tubing and a female quick disconnect one way valve socket 18 substantially identical to valve 14 is provided at the other end.

The quick disconnect one way valve sockets are of well known construction such as that upon engagement of the male connector plug the valve is opened. Such valves are sold, for example, by The Hansen Manufacturing Company, Cleveland, Ohio under model series 1000 and series 3000. The one way female tank connectors are a standard beverage industry item as are the tanks themselves. For example, such tanks and connectors are sold by Cornelius Company, Anoka, Minnesota under the trademark Spartan.

The system further includes a portable liquid tank 19 which is sealed and has a pair of male quick disconnect one way valves 20, 21 thereon and an interconnecting supply hose 22 having a female connector 23 same as socket 18 on one end and a female connector 24 at the other end adapted to interconnect with the OUT valve 20 on the liquid tank 19.

The system further includes a source of pressure 25, which is the same in every respect as tank 19, such as a portable tank containing nitrogen under the appropriate pressure for the fungicide to be fed, which has a male quick disconnect one way OUT valve 26 thereon and a gas interconnecting hose 27 with female connectors 28, 29 each similar to connector 24 on the ends thereof adapted to engage respectively with the IN valve 21 on the liquid tank 19 and the OUT valve 30 on the fluid tank 25 which is pressurized through IN valve 31.

Figure 5:
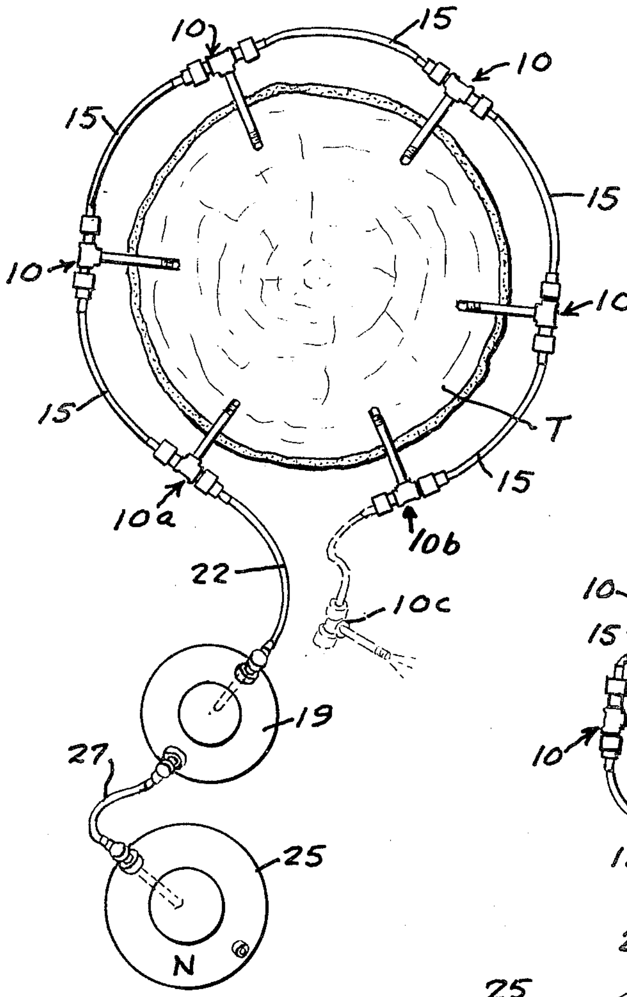
FIG. 5 is a horizontal sectional view through a tree being treated with the system.

In the treatment of a tree, holes are drilled radially in the tree about the circumference of the tree at spaced circumferential points on the (trunk or into each root flair) and an injector assembly 10 is provided in each hole (FIG. 5). Successive nozzle assemblies are interconnected by hose assemblies 15. The first injector assembly 10*a* of a series is connected to the tank 19 by supply hose 22 and the liquid tank is, in turn, connected to the pressure tank 25 by hose 27. The last nozzle assembly 10*b* in the series is temporarily connected by a further checking nozzle assembly 10*c*, as shown in broken lines, until a flow of liquid is assured through each nozzle assembly 10 by the fact that the liquid flows outwardly through the pipe of the checking nozzle assembly 10*c*. The checking nozzle assembly is then removed and the treatment is permitted to continue until the entire contents of the tank are dispensed.

In the event that the tree is of such a size and has a degree of disease that requies more than one tank, additional tanks 19 may be provided in series with additional interconnecting hoses 27.

In order to conserve the usage of tanks, one tank can be inserted adjacent the first nozzle assembly 10*a* and the previously used tank can be removed by temporarily disconnecting the supply and interconnecting hoses 22 and 27.

Since substantially identical nozzle assemblies are provided, no special nozzle assembly or different nozzle assembly is required in the last of the series. Furthermore, it is possible to provide nozzle assemblies in the next tree to be treated and then quickly change over the hose assemblies to the second tree after the first tree is treated, thereby conserving the investment in hose assemblies.

Figure 6:
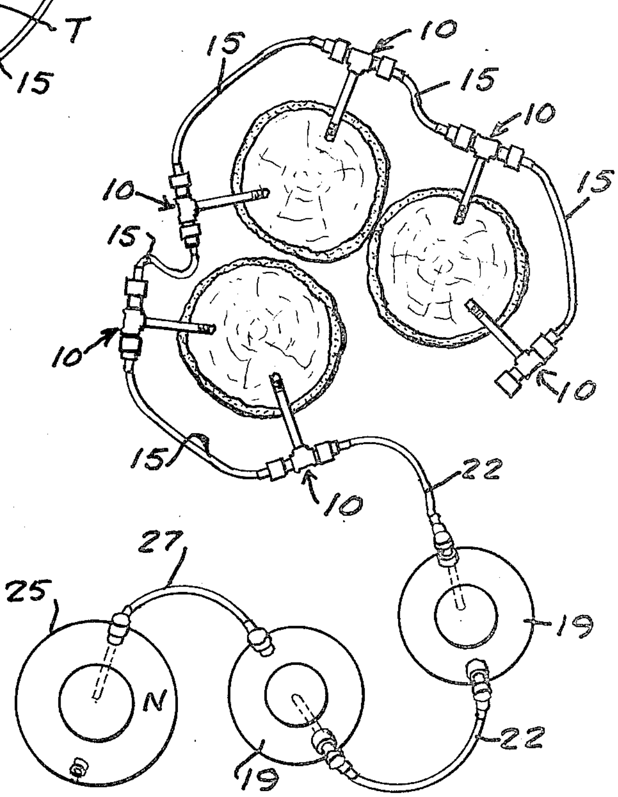
FIG. 6 is a horizontal sectional view through a clump of trees being treated with the system.

Since the hose assemblies and nozzle assemblies are substantially identical, it is possible to interconnect hose assemblies to one another bridging around branches. This also permits the bridging across a nozzle assembly when it is determined that a nozzle assembly is plugged in that it has reached an area of the tree which does not permit the flow of the fungicide. In addition, a plurality of trees can be treated as shown in FIG. 6.

Figure 7:
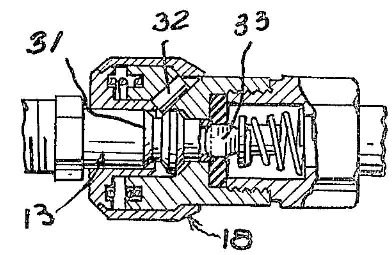
FIG. 7 is a sectional view through a typical coupling.

A typical coupling between an injector assembly 10 and a hose assembly 15 is shown in FIG. 7 in cross section. The male plug 13 includes a groove 31 which is engaged by spring-loaded pins 32 to retain the plug in engagement with the female socket 18. The end of the plug 13 engages a valve 33 to provide communication between the hose and injector assembly.

The connections between the male plugs and sockets associated with the containers 19, 25 are similar except that preferably spring-loaded valves are provided in both the female and male connectors. As indicated above, such couplings and connectors are well known in the art of beverage containers and couplings.

I claim:

1. In a tree treating system, the combination comprising a plurality of substantially identical injector assemblies, each said injector assembly comprising a pipe insertable in an opening in a tree, a female quick disconnect one way valve socket connected to said pipe, and a male connector plug thereon also connected a plurality of substantially identical hose assemblies, each said hose assembly comprising a flexible length of tubing, a female quick disconnect one way valve socket connected to one end of said tubing, and a male connector plug connected to the other end of said tubing, such that each said injector assembly may be placed in an opening in a tree and said injector assemblies may be connected in series by connecting the female connector socket of said first injector assembly to the plug of a hose assembly, connecting the female connector socket of said hose assembly to the plug of the next adjacent injector assembly, and similarly interconnecting successive injector assemblies by hose assemblies.

2. The combination set forth in claim 1 including a liquid container having a first male quick disconnect one way valve thereon, a first connecting hose having a female connector socket connected to one end thereof and adapted to engage the male connector plug of the first of a series of injector assemblies and a female connector on the other end thereof adapted to be connected to the male quick disconnect one way valve of the liquid container, said liquid container having a second male quick disconnect one way valve, a second connecting hose, a source of fluid pressure, a male quick disconnect one way valve on said source of fluid pressure, said second connecting hose having a female connector thereon adapted to engage the second male quick disconnect one way valve on said liquid container and a similar female quick disconnect one way valve at the other end thereof adapted to engage the male quick disconnect one way valve on a source of fluid pressure.

3. The combination set forth in claim 2 wherein said source of fluid pressure comprises a tank.

4. The combination set forth in claim 3 wherein said tank is filled with nitrogen.

5. The combination set forth in claim 2 including a plurality of substantially identical liquid containers and substantially identical interconnecting hoses connected in series.

6. The combination set forth in claim 1 wherein said flexible tubing of each said hose assembly is transparent such that liquid flowing therethrough may be viewed.

7. In a tree treating system, the method comprising providing a plurality of substantially identical injector assemblies, each said injector assembly comprising a pipe insertable in an opening in a tree, a female quick disconnect one way valve socket on said pipe and a male connector plug on said pipe, providing a plurality of substantially identical hose assemblies, each said hose assembly comprising a flexible length of tubing, a female quick disconnect one way valve socket on one end of said tubing, and a male connector plug on the other end of said tubing, placing each said injector assembly in an opening in a tree, connecting said injector assemblies in series by connecting the female connector socket of said first injector assembly to the male plug of a hose assembly, connecting the female connector socket of said hose assembly to the plug of the next adjacent injector assembly, and similarly interconnecting successive injector assemblies by hose assemblies, providing a liquid container having a male quick disconnect one way valve thereon, providing a connecting hose having a female connector on one end thereof and a female connector on the other end thereof, connecting the first-mentioned female connector of said last-mentioned connecting hose to the male connector plug of the first of the series of injector assemblies, connecting the female connector of said connecting hose to the male quick disconnect one way valve of the liquid container, providing a source of pressure, providing a second male quick disconnect one way valve on said liquid container, providing a second connecting hose, said second connecting hose having a female connector thereon and a similar female quick disconnect one way valve at the other end thereof, connecting the first-mentioned female connector on the said connecting hose on said second male quick disconnect one way valve on said liquid container, and connecting the last-mentioned female quick disconnect one way valve on said second connecting hose to the male quick disconnect one way valve on the source of fluid pressure.

8. The method set forth in claim 7 including the step of connecting a plurality of substantially identical liquid containers in series with additional interconnecting hoses.

* * * * *